US008229615B2

(12) United States Patent
Sakamoto et al.

(10) Patent No.: US 8,229,615 B2
(45) Date of Patent: Jul. 24, 2012

(54) VEHICLE DRIVE POWER GENERATION CONTROL APPARATUS

(75) Inventors: Akira Sakamoto, Obu (JP); Keisuke Tani, Anjo (JP); Kazunao Yamada, Toyota (JP)

(73) Assignee: Denso Corporation, Kariya (JP)

( * ) Notice: Subject to any disclaimer, the term of this patent is extended or adjusted under 35 U.S.C. 154(b) by 211 days.

(21) Appl. No.: 12/700,130

(22) Filed: Feb. 4, 2010

(65) Prior Publication Data
US 2010/0204863 A1 Aug. 12, 2010

(30) Foreign Application Priority Data

Feb. 4, 2009 (JP) .................................. 2009-24243

(51) Int. Cl.
B60L 9/00 (2006.01)
B60L 11/00 (2006.01)
(52) U.S. Cl. ........................ 701/22; 180/65.21; 705/412
(58) Field of Classification Search .................... 701/22; 180/65.285, 65.27, 65.28, 65.265, 65.21; 903/906–907, 930, 902, 904; 705/412
See application file for complete search history.

(56) References Cited

U.S. PATENT DOCUMENTS

| 5,670,830 | A | * | 9/1997 | Koga et al. .................. 307/10.1 |
| 5,734,099 | A |   | 3/1998 | Saigo et al. |
| 5,815,824 | A | * | 9/1998 | Saga et al. ..................... 701/22 |
| 6,181,991 | B1 | * | 1/2001 | Kondo et al. .................. 701/22 |
| 6,697,717 | B2 | * | 2/2004 | Shioda et al. .................. 701/22 |
| 7,141,321 | B2 | * | 11/2006 | McArthur et al. ............ 429/443 |
| 7,413,042 | B2 | * | 8/2008 | Saitou et al. ............. 180/65.285 |
| 7,717,202 | B2 | * | 5/2010 | Brigham et al. ......... 180/65.265 |
| 7,761,203 | B2 |   | 7/2010 | Yamada |
| 7,849,944 | B2 | * | 12/2010 | DeVault ..................... 180/65.29 |
| 8,000,852 | B2 | * | 8/2011 | Oyobe et al. ................... 701/22 |
| 8,005,587 | B2 | * | 8/2011 | Tamor et al. ................... 701/22 |
| 8,024,082 | B2 | * | 9/2011 | Richter et al. .................. 701/22 |
| 8,086,364 | B2 | * | 12/2011 | Xue et al. ....................... 701/22 |

(Continued)

FOREIGN PATENT DOCUMENTS

EP 1 932 740 6/2008

(Continued)

OTHER PUBLICATIONS

Constructing an intelligent travel information platform based on Location Base Service; Hung, J.C.; Yueh Hsuan Lee; Pervasive Computing (JCPC), 2009 Joint Conferences on; Digital Object Identifier: 10.1109/JCPC.2009.5420067 Publication Year: 2009, pp. 845-850.*

(Continued)

Primary Examiner — Cuong H Nguyen
(74) Attorney, Agent, or Firm — Nixon & Vanderhye P.C.

(57) ABSTRACT

A hybrid vehicle control ECU calculates an estimated EV travelable distance based on a minimum travel cost and a usable charge amount of a battery, when a next external charge point, at which an external power source is available for charging, is set. The minimum travel cost indicates a minimum value of electric power amount consumed by a battery when a vehicle travels a unit distance. If the estimated EV travelable distance is longer, electric motor travel is selected estimating that it is possible to reach the next external charge point. If a remaining distance is longer and a present SOC is higher than a usable SOC lower limit, hybrid travel is selected. If the present SOC is lower than the usable SOC lower limit, a constant SOC travel is selected.

16 Claims, 10 Drawing Sheets

U.S. PATENT DOCUMENTS

| | | | |
|---|---|---|---|
| 8,140,204 B2 * | 3/2012 | Okubo et al. | 701/22 |
| 2003/0078707 A1 * | 4/2003 | Shioda et al. | 701/22 |
| 2007/0029121 A1 * | 2/2007 | Saitou et al. | 180/65.2 |
| 2008/0262667 A1 * | 10/2008 | Otabe | 701/22 |
| 2008/0262668 A1 * | 10/2008 | Yamada | 701/22 |
| 2009/0030568 A1 * | 1/2009 | Amano et al. | 701/22 |
| 2009/0277701 A1 | 11/2009 | Soma et al. | |
| 2010/0049389 A1 * | 2/2010 | Ando | 701/22 |
| 2010/0138093 A1 * | 6/2010 | Oku et al. | 701/22 |
| 2010/0204863 A1 * | 8/2010 | Sakamoto et al. | 701/22 |
| 2011/0125357 A1 * | 5/2011 | Harumoto et al. | 701/22 |

FOREIGN PATENT DOCUMENTS

| | | | |
|---|---|---|---|
| JP | 08-154307 | | 6/1996 |
| JP | 8-265909 | | 10/1996 |
| JP | 09-191505 | | 7/1997 |
| JP | P2001-299694 | * | 9/2001 |
| JP | 2002-262404 | | 9/2002 |
| JP | 2005-020955 | | 1/2005 |
| JP | 2007-082690 | * | 3/2007 |
| JP | 2007-112756 | * | 4/2007 |
| JP | 2008-087516 | | 4/2008 |
| JP | 2008-120186 | | 5/2008 |
| JP | 2008-131779 | | 6/2008 |
| JP | 2008-155820 | | 7/2008 |
| JP | 2008-198382 | * | 7/2008 |
| JP | 2008-265594 | | 11/2008 |
| WO | PCT/JP2009/063047 | * | 12/2010 |

OTHER PUBLICATIONS

Electric-bicycle propulsion power; Oman, H.; Morchin, W. C.; Jamerson, F. E.; WESCON/'95. Conference record. 'Microelectronics Communications Technology Producing Quality Products Mobile and Portable Power Emerging Technologies' Digital Object Identifier: 10.1109/WESCON.1995.485440; Publication Year: 1995.*

Automating mode detection for travel behaviour analysis by using global positioning systemsenabled mobile phones and neural networks; Gonzalez, P.A. et al.; Intelligent Transport Systems, IET; vol. 4, Issue: 1; Digital Object Identifier: 10.1049/iet-its.2009.0029; Publication Year: 2010, pp. 37-49.*

The environmental impact of using different supply voltages for HEVs and FCEVs; Miller, P.; Power Conversion Conference—Nagoya, 2007. PCC '07; Digital Object Identifier: 10.1109/PCCON. 2007.373141; Publication Year: 2007, pp. 1357-1361.*

Regeneration of power in hybrid vehicles; Apter, R.; Prathaler, M.; Vehicular Technology Conference, 2002. VTC Spring 2002. IEEE 55th; vol. 4; Digital Object Identifier: 10.1109/VTC.2002.1002987; Publication Year: 2002, pp. 2063-2069 vol. 4.*

Japanese Office Action dated Nov. 9, 2010 for corresponding Japanese Application No. 2009-024243 with English Translation.

* cited by examiner

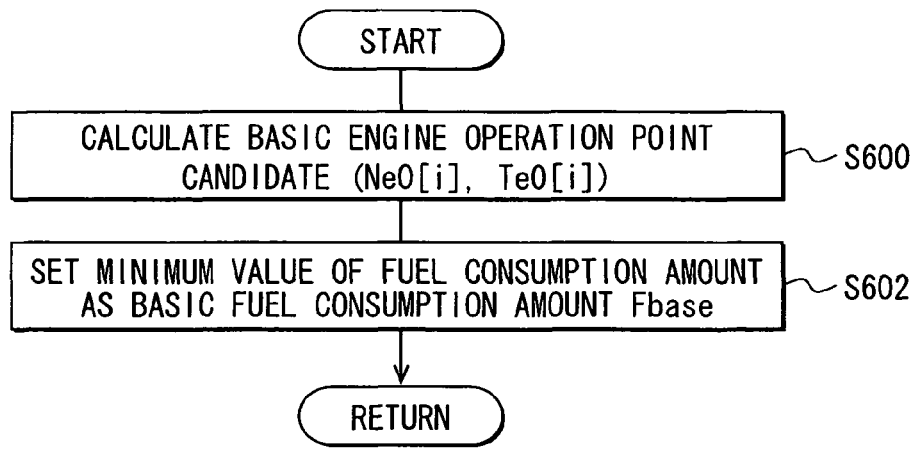
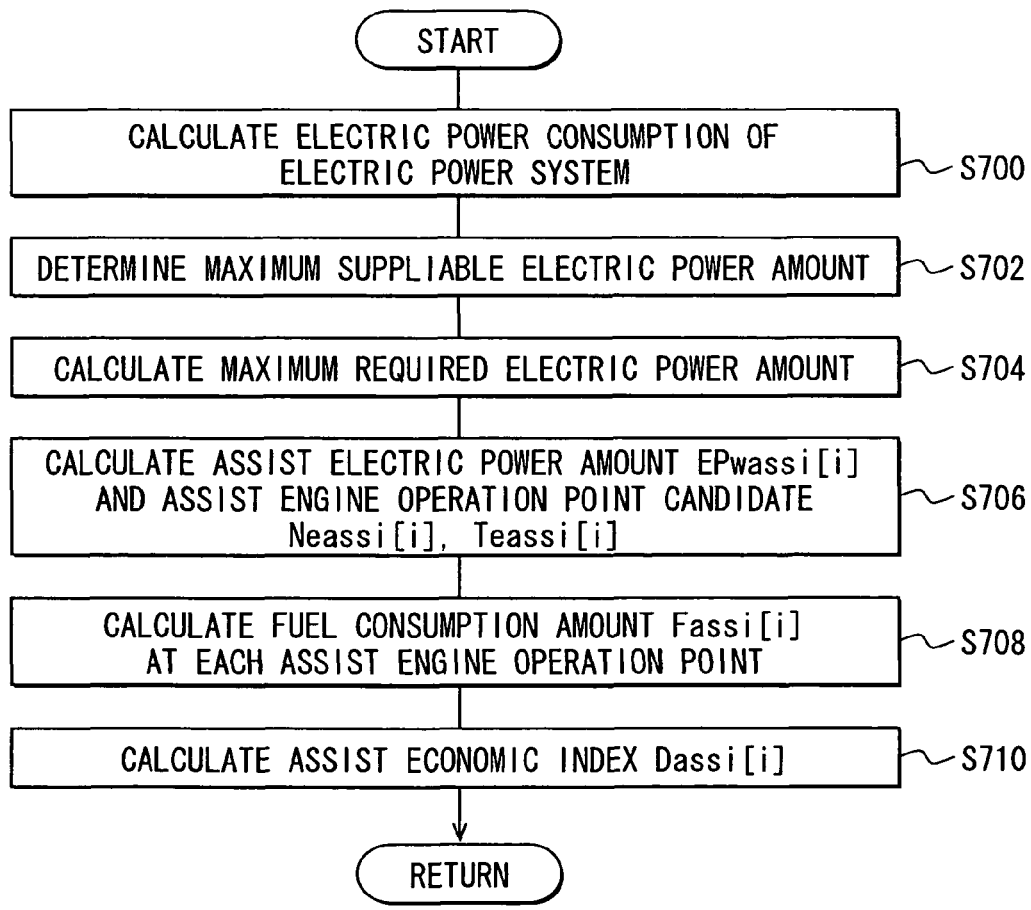

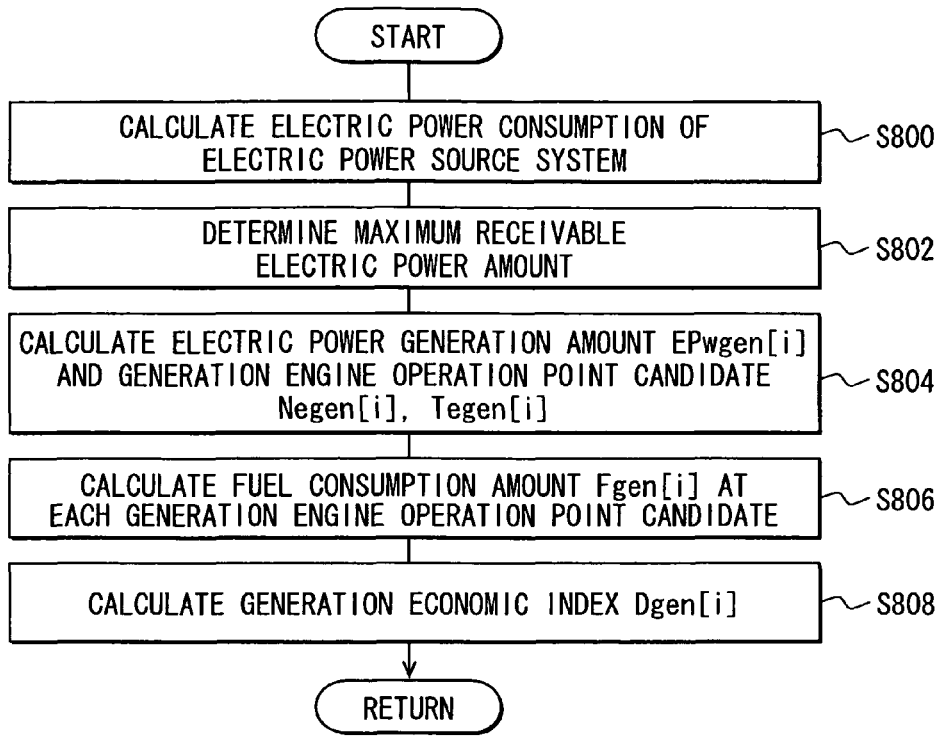
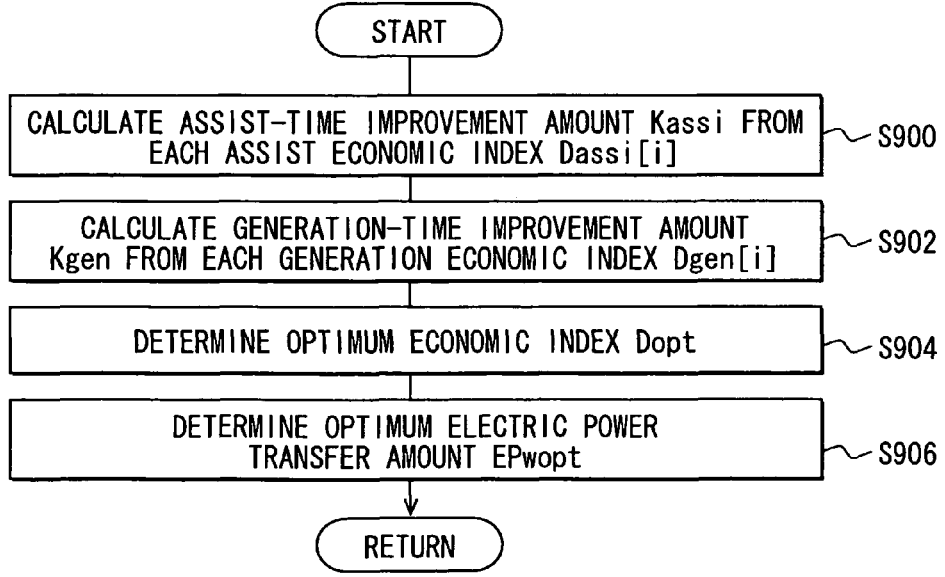

VEHICLE DRIVE POWER GENERATION CONTROL APPARATUS

CROSS REFERENCE TO RELATED APPLICATION

This application is based on and incorporates herein by reference Japanese Patent Application No. 2009-24243 filed on Feb. 4, 2009.

FIELD OF THE INVENTION

The present invention relates to a control apparatus for drive power generators of a vehicle, which are used in a hybrid vehicle to control drive power generators.

BACKGROUND OF THE INVENTION

A conventional hybrid vehicle has, as a drive power generator for generating drive power to drive the drive shaft of the vehicle, an internal combustion engine, a rotary electric machine and an electric charge storage device, which transfers (supplies and receives) electric power to and from the rotary electric machine. In this hybrid vehicle, energy required for travel is charged to the charge storage device at charge stations, at which an electric power supply (commercial electric power source or the like) external to the vehicle is available (for example, patent documents 1 and 2). By using the electric power supply, which is external to the vehicle, fuel cost can be reduced and the amount of exhaust emission during travel can also be reduced.
(Patent document 1) JP 8-154307A
(Patent document 2) JP 2007-99223A In the hybrid vehicle according to patent document 1, the output of the rotary electric machine is limited and the internal combustion engine is used to travel, when a predetermined period elapses after charging by the an external charging device. When the output of the electric rotary machine is limited, an alarm is issued to a driver, so that the driver is urged to perform charging by the external charging device. In this hybrid vehicle, only a travel time period after the charging by the external charging device is used as an index for urging the charging by the external charging device. The charging is urged in some instances, even when the charge storage device has a high state of charge (SOC) and cannot store so much electric charge any more. Since the electric power cannot be charged from the external power source, the amount of exhaust emission cannot be reduced sufficiently.

In the hybrid vehicle according to patent document 2, a travel distance to a next external charge point is acquired from a car navigation device and the upper and lower control limit values of the SOC of the charge storage device are set lower as the vehicle approaches the external charge point. With this setting, the SOC can be lowered at the time of arriving at the external charge point, and the charge storage device can be charged with more electric power at the external charge point. In this hybrid vehicle, the upper and lower control limit values of the SOC of the charge storage device are lowered as the hybrid vehicle approaches the next external charge point. The device is charged and discharged, when the SOC reaches the lower and upper control limit values, respectively.

In some cases, the hybrid vehicle has to stop for a long time in traveling toward the charge point or travel at low speeds by using the electric motor. As a result, the SOC tends to fall below the lower control limit value before the hybrid vehicle arrives at the next external charge point. For this reason, in the hybrid vehicle according to patent document 2, the motor/generator is driven by the drive power of the engine to generate electric power-even when the actual SOC does not fall to a target control limit value of the SOC, which is set for the next external charge point. The charge storage device is charged with the electric power thus generated so that the actual SOC is maintained higher than the lower control limit value at each time. As a result, the period of operating the engine cannot be shortened sufficiently. In addition, the engine must be operated at operation points, at which fuel consumption efficiency is low, during travel stop (idling), low speed travel and the like of the vehicle. Thus, the fuel cost and exhaust emission cannot be reduced sufficiently.

SUMMARY OF THE INVENTION

It is therefore an object of the present invention to provide a control apparatus for drive power generators of a vehicle, which is capable of reducing fuel consumption amount and exhaust emission amount.

A control apparatus for drive power generators according to the present invention is provided for a hybrid vehicle, which includes an internal combustion engine and a rotary electric machine as drive power generators for generating power to drive a drive shaft of the vehicle, a charge storage device for transferring electric power to and from the rotary electric machine, and an external electric power input device for receiving electric power from an external power source external to the vehicle and charging the charge storage device with received electric power. The control apparatus for drive power generators further includes a remaining distance calculation section, an electric motor travelable distance estimation section and a travel mode selection section.

The remaining distance calculation section calculates a remaining distance to a next external charge point, at which electric charging is possible by the external power source. The electric motor travelable distance estimation section estimates an electric motor travelable distance, which is a travelable distance attained by the vehicle when traveling in an electric motor travel mode by stopping the internal combustion engine and supplying the electric power from the charge storage device to the rotary electric machine used as the power generator. The travel mode selection section compares the remaining distance and the electric motor travelable distance, and selects the electric motor travel mode and an internal combustion engine travel mode based on a comparison result indicating that the vehicle can and cannot travel to the next external charge point in the electric motor travel mode, respectively, the engine travel mode using the internal combustion engine as the power generator.

BRIEF DESCRIPTION OF THE DRAWINGS

The above and other objects, features and advantages of the present invention will become more apparent from the following detailed description made with reference to the accompanying drawings. In the drawings:

FIG. 6 is a flowchart showing processing (S510) shown in FIG. 5;

FIG. 7 is a flowchart showing processing (S512) shown in FIG. 5;

FIG. 8 is a flowchart showing processing (S514) shown in FIG. 5;

FIG. 9 is a flowchart showing processing (S516) shown in FIG. 5;

DETAILED DESCRIPTION OF THE PREFERRED EMBODIMENT

An embodiment of the present invention will be described below with reference to the accompanying drawings.

Figure 1:
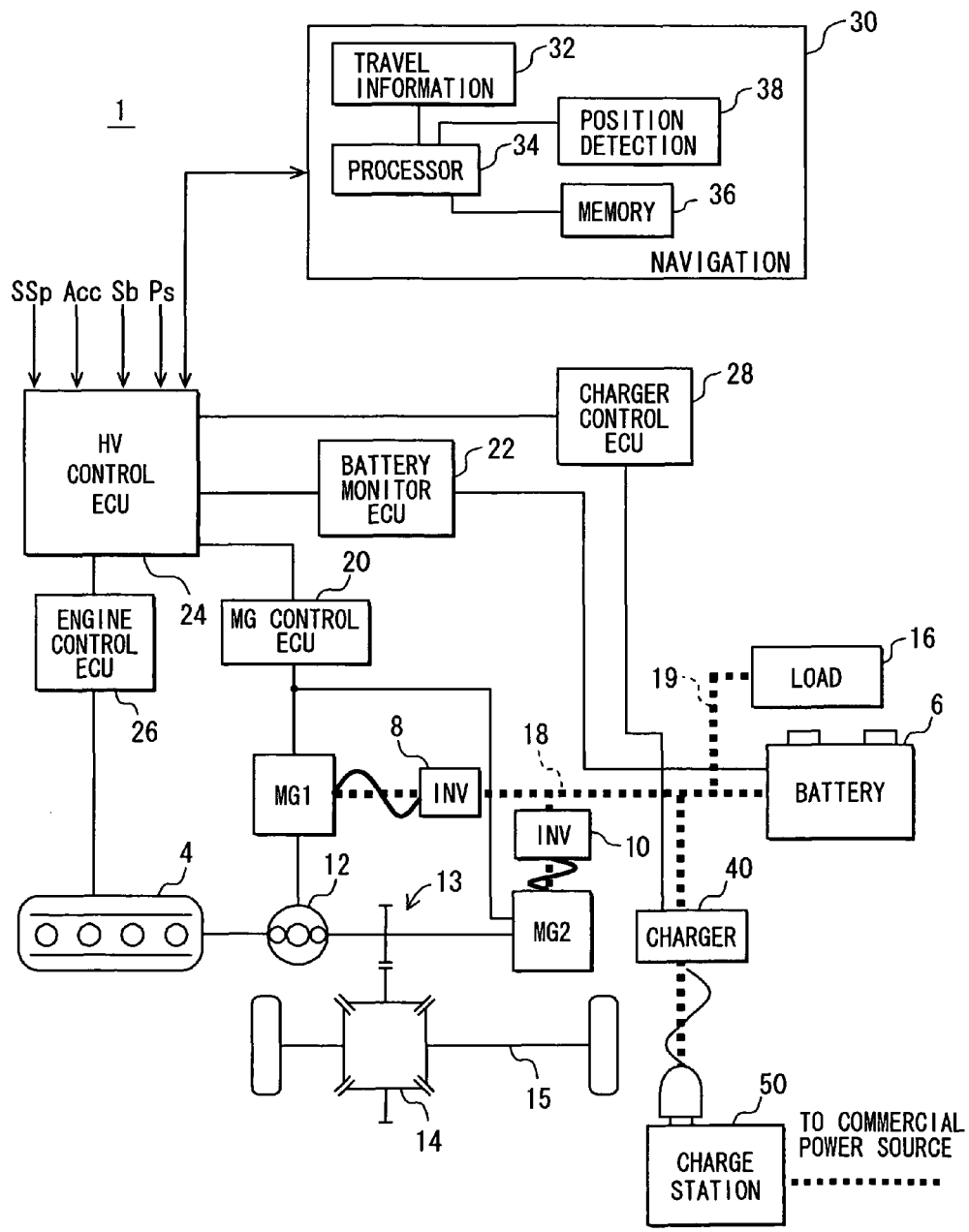
FIG. 1 is a schematic diagram showing a hybrid vehicle.

As shown in FIG. 1, a vehicle 1 is a series-parallel type hybrid vehicle, which has an engine 4 and two motor/generators MG1 and MG2 as drive power generators.

The engine 4 is an internal combustion engine that burns gasoline or diesel oil. The output shaft of the engine 4 is coupled to planetary gears of a planetary gear set 12. The output shaft of the first motor/generator MG1 is coupled to the sun gear of the planetary gear set 12. The input shaft of a speed reducer 13 is coupled to the ring gear of the planetary gear set 12. Thus, the planetary gear set 12 functions as a drive power divider. The planetary gear set 12 integrates the drive power from the engine 4 and the drive power from the first motor/generator MG1 and inputs the integrated drive power to the input shaft of the speed reducer 13. The planetary gear set 12 also divides the drive power from the engine 4 for the input shaft of the speed reducer 13 and the first motor/generator MG1.

The output shaft of the second motor/generator MG2 is also coupled to the input shaft of the speed reducer 13. The speed reducer 13 includes a pair of normally meshing gears. The rotation of the output shaft of the speed reducer 13 is transmitted through differential gears 14 to an axle (drive shaft) 15.

The first motor/generator MG1 and the second motor/generator MG2 are connected to a first inverter 8 and a second inverter 10, respectively. The first inverter 8 and the second inverter 10 are connected electrically to a battery 6 by an electric power transfer (supply and reception) cable 18. When electric power is supplied from the battery 6, the first and the second motor/generators MG1 and MG2 function as motors to generate drive power. When rotation of tire wheels or the engine 4 is transferred, the motor/generators MG1 and MG2 are rotated to function as a generator for generating electric power. It is also possible to operate one of the motor/generators MG1 and MG2 as an electric power generator and the other of the motor/generators MG1 and MG2 as an electric motor by supplying the electric power generated by that generator. The electric power generated by the first and the second motor/generators MG1 and MG2 operating as the generators is stored in the battery 6.

The battery 6 corresponds to an electric charge storage device, and may be a nickel-hydrogen secondary battery. The battery 6 is connected to the inverters 8 and 10 by the electric power transfer cable 18, and also connected by an in-system power supply cable 19 to various electric loads 16 mounted in the vehicle 1.

The battery 6 and the electric loads 16 form an electric power source system. Although not shown in the figure, a MG control unit 20, a battery monitor ECU 22, a HV control ECU 24 and an engine control ECU 26 are also supplied with electric power from the battery 6 through the in-system power supply cable 19. These ECUs 20 to 26 are also examples of the electric loads 16.

From time to time, the battery monitor ECU 22 acquires a current, which flows in the in-system power supply cable 19 and is detected by a current sensor (not shown), monitors a voltage of the in-system power supply cable 19, and calculates the state of charge (SOC) of the battery 6 based on the detected current and voltage. A signal indicating the calculated SOC is supplied to the HV control ECU 24.

The HV control ECU 24 is supplied with a speed signal representing the vehicle travel speed SSp, an accelerator position signal Acc representing the accelerator position, a brake signal Sb representing the brake pedal pressing force and a shift position signal Ps representing the shift lever position of a transmission. The HV control ECU 24 further transmits and receives signals to and from the MG control ECU 20, the battery monitor ECU 22, the engine control ECU 26 and a navigation device 30. The HV control ECU 24 executes predetermined calculation processing based on various signals supplied thereto.

This calculation processing includes processing of calculating a drive power demand value Dp and a deceleration power demand value Bp, which are demanded by the vehicle 1. Based on the accelerator position and the brake pedal pressing force, either one of the drive power demand values Dp and Bp is determined to be calculated. The deceleration power demand value Bp is calculated, when it is determined based on the accelerator position and the brake pedal pressing force that a driver is demanding deceleration. On the other hand, the drive power demand value Dp is calculated, when it is determined based on the accelerator position and the brake pedal pressing force that the driver is demanding acceleration or maintenance of the vehicle travel speed.

In calculating the drive power demand value Dp, a demand drive torque is set first based on the accelerator position represented by the accelerator position signal Acc and the shift position represented by the shift position signal Ps by using a pre-stored demand drive torque determination map. Then the rotation speed of the axle shaft 15 is calculated based on the vehicle travel speed represented by the vehicle travel speed signal SSp, and the drive power demand value Dp is calculated by multiplying the calculated rotation speed by the demand drive torque.

In calculating the deceleration power demand value Bp, the brake pedal pressing force is determined first based on the brake signal Sb or the accelerator return amount is determined first based on the accelerator position represented by the accelerator position signal Acc. The brake pedal pressing force or the accelerator return amount is used as an acceleration/deceleration operation amount. The demanded deceleration torque is set based on the acceleration/deceleration operation amount and the shift position represented by the shift position signal by using a pre-stored demanded deceleration torque determination map. The rotation speed of the axle shaft 15 is calculated based on the vehicle travel speed represented by the vehicle travel speed signal SSp, and the deceleration power demand value Bp is calculated by multiplying the calculated rotation speed by the demanded deceleration torque.

The HV control ECU 24 further calculates a target power of the engine 4 based on the drive power demand value Dp or the deceleration power demand value Bp, and an amount of electric power transfer EPw with the power source system. The electric power transfer amount EPw represents an electric power amount that flows in the electric power transfer cable 18. When the electric power source system needs electric power, the electric power generated by the motor/generator MG is supplied to the power source system. When the vehicle is in the assist travel mode, electric power is supplied to the motor/generator MG1 or MG2 from the electric power source system.

In case of calculating the drive power demand value Dp and supplying electric power to the electric power source system, the target power of the engine 4 equals the drive power, by which the motor/generator MG can generate a torque required to generate the electric power supplied to the electric power source system while generating the drive power of the drive power demand value Dp from the axle shaft 15. In case of calculating the drive power demand value Dp and performing the assist travel, the target power of the engine 4 equals a value, which is determined by subtracting from the drive power demand value Dp a power assisted by the motor/generator MG with the electric power of the battery 6 while taking mechanical loss. If the deceleration power demand value Bp is calculated, the target power of the engine 4 becomes zero.

The HV control ECU 24 further calculates a torque required for the engine 4 to generate the target torque. An engine torque command signal, which commands output of the calculated torque, is transmitted to the engine control ECU 26.

In case of the assist travel, the HV control ECU 24 calculates a power-running torque, which the motor/generator MG is required to generate, based on a difference between the drive power demand value Dp and the target power of the engine 4. In case of deceleration of the vehicle 1, that is, when the deceleration power demand value Bp is calculated, a regenerative torque is calculated based on the deceleration power demand value Bp and the brake pedal pressing force. A MG torque command signal, which commands output of the calculated torque, is transmitted to the MG control ECU 20.

The engine control ECU 26 calculates a rotation speed of the engine from time to time based on a signal of an engine rotation sensor (not shown). An actual torque of the engine 4 is estimated based on the rotation speed and a throttle position of the engine 4 calculated from time to time in the conventional manner. The engine 4 is so controlled to generate the torque, which is commanded by the engine torque command signal transmitted from the HV control ECU 24.

The MG control ECU 20 calculates the rotation speeds of the motor/generators MG1 and MG2 based on signals of conventional rotation detection sensors such as resolvers, and calculates torques of the motor/generators MG1 and MG2 based on the currents flowing in the motor/generators MG1 and MG2. The motor/generators MG1 and MG2 are so controlled that the toques of the motor/generators MG1 and MG2 calculated from time to time equal the torques commanded by the MG torque command signals transmitted from the HV control ECU 24.

The battery monitor ECU 22 integrates amounts of electric charge (that is, charge/discharge amount) flowing in the electric power transfer cable 18, and calculates the SOC of the battery 6 from time to time based on the integrated amount of electric charge, the rated capacity of the battery 6 and the charge/discharge characteristics of the battery 6. Based on the calculated SOC and the rated capacity of the battery 6, a chargeable maximum electric power amount and a dischargeable maximum electric power amount, to which the battery 6 is allowed to be charged and discharged respectively, are calculated from time to time. The chargeable maximum electric power amount and the dischargeable maximum electric power amount thus calculated are transmitted to the HV control ECU 24 to be used in calculating, for example, the target power of the engine 4.

The navigation device 30 includes a travel information section 32, a processor section 34, a memory section 36 and a position detection section 36. The travel information section 32 acquires various information from the HV control ECU 24 and makes correspondence between the acquired information and the position information. The information thus acquired includes discharge electric power of the battery 6, electric power supplied to the battery 6, electric power suppliable to the battery 6, SOC and the like.

The processing section 34 stores the information, which are made to correspond to the position information by the travel information section 32, in a memory device of the memory section 36. The processing section 34 reads out various information stored in the memory device and determines the amount of charging by a charger device 40.

The memory section 36 stores a road map database and the information processed by the processing section 34. The position detection section 38 includes at least one device such as a GPS receiver, which is normally used to detect vehicle position. The position detection section 38 detects the present position of the vehicle 1 from time to time by using such a device. The present position preferably includes altitude, although not absolutely necessary.

The charger 40, which is an external electric power input device, is connected to the electric power transfer cable 18 and includes a charging cable and a charging connector. With the charging connector being coupled to an electric power outlet of a charge station 50 or a home, which is external to the vehicle, the charger 40 receives electric power from an electric power supply facility provided at the charge station 50 or home and supplies the received electric power to the battery 6 and the electric loads 16. The amount of electric power, that is, amount of charge, which the charger 40 supplies to the battery 6, is controllable by a charger control ECU 28.

The charge station 50 is a facility, where a vehicle-mounted battery is chargeable by an external electric power source. The charge station 50 provides one or a plurality of outlets of electric power and parking spaces for vehicles. The electric power, which the charge station 50 supplies, may be the commercial electric power generated at other locations or at the charge station 50 itself. The electric power may be a combination of power generated at the charge station 50 and the other location.

The charger control ECU 28 controls the amount of charge of the charger 40 so that the battery 6 is charged to a predetermined voltage or a predetermined amount of current is charged to the battery 6.

Figure 2:
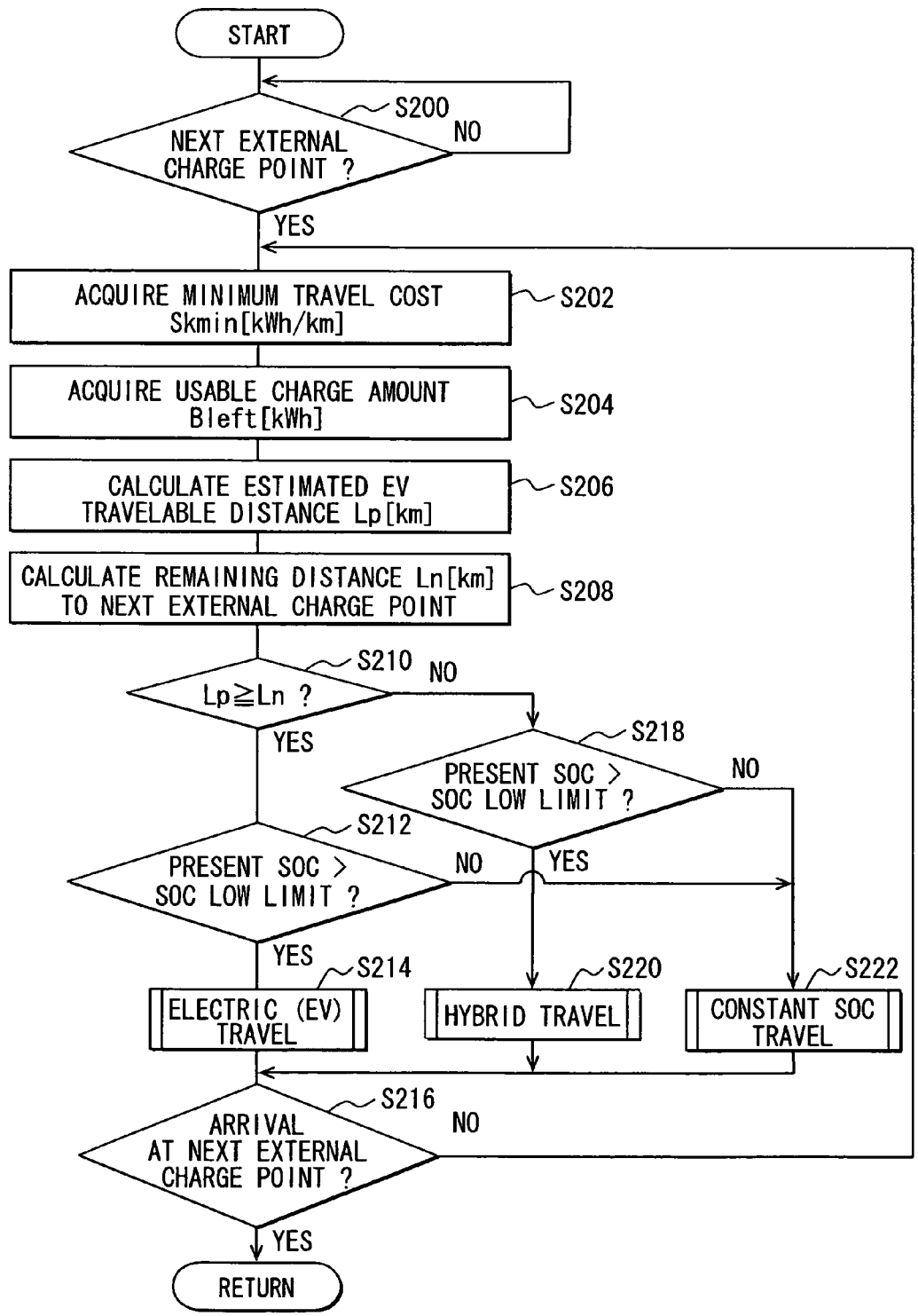
FIG. 2 is a flowchart showing processing of controlling a drive power generator.

The HV control ECU 24 of the vehicle 1 is configured to execute processing of drive power generator control shown in FIG. 2. This processing is repeated at a fixed interval and executed by acquiring calculation results of the other ECUs 20, 22, 26 and 28.

First at step S200, it is checked whether the next external charge point has been set. The determination at step S200 becomes YES, if the destination of travel set in the navigation device 30 is the external charge point. The determination at step S200 also becomes YES, if it is possible to perform charging by using the charger 40 at a home of a driver and that home has been set as the destination. Even in case that no destination has been set by a driver, the determination at step S200 may be made to be YES if it is possible to determined from the past travel history that the vehicle can be charged externally at the destination. It is also possible to determine that the vehicle can be charged at the destination, if the vehicle is traveling a part of a road, which a driver has set as a learning travel interval.

Step S200 is repeated if the determination at step S200 is NO. If the determination at step S200 is YES, steps S202 to S206 are executed as an electric motor travelable distance estimation section.

At step S202, a minimum travel cost Skmin [kWh/km] stored in a predetermined memory device is acquired. For example, the minimum travel cost Skmin is acquired with respect to a travel interval ending at the next external charge point, which is determined as having been set at step S200. Processing for determining the minimum travel cost Skmin will be described below with reference to FIG. 3. If no minimum travel cost Skmin is stored with respect the travel interval ending at the next external charge point, which is set as the destination, another minimum travel cost Skmin for a different external charge point is acquired. It is also possible to estimate a minimum travel cost by using map information (altitude data and the like) and an average, vehicle travel speed.

At next step S204, a present usable charge storage amount Bleft [kWh] is acquired. The usable amount Bleft is calculated based on the present value of SOC calculated by the battery monitor ECU 22 from time to time and a predetermined lower control limit value of usable SOC.

At next step S206, an estimated EV travelable distance Lp [km], which is an estimate of a distance the vehicle can travel by the electric motor. The estimated distance Lp is calculated based on the following equation Eq. 1.

$$Lp = Bleft/Skmin \quad (Eq. 1)$$

At next step S208, which is processing as a remaining distance calculation section, the navigation device 30 calculates the remaining distance Ln [km] to the next external charge point based on the present position of the vehicle 1, the position of the next external charge point and the road map information.

Following steps S210, S212 and S218 are processing as a travel mode selection section. At step S210, the estimated EV travelable distance Lp calculated at step S206 is compared with the remaining distance Ln to the next external charge point calculated at step S208.

If the estimated EV travelable distance Lp is equal to or longer than the remaining distance Ln, step S212 is executed. At step S212, the present SOC is compared with the lower control limit value of usable SOC. If the present SOC is greater than the lower control limit value of the usable SOC, it can be estimated that the vehicle can travel up to the next external charge point in the electric motor travel mode. As a result, step S214 is executed so that the vehicle is driven to travel in the electric motor travel mode. This motor travel performed at S214 will be described below with reference to FIG. 4.

If the result of comparison at step S212 indicates that the present SOC is equal to or less than the lower control limit value of usable SOC, step S222 is executed so that the vehicle is driven to travel in the constant SOC travel mode. This constant SOC travel will be described below with reference to FIG. 4.

If the result of comparison at step S210 indicates that the estimated EV travelable distance Lp is shorter than the remaining distance Ln, step S218 is executed. At step S218 as well, the present SOC is compared with the lower control limit value of usable SOC as in step S212. If the present SOC is greater than the lower control limit value of usable SOC, step S220 is executed so that the vehicle is driven to travel in the hybrid travel mode. This hybrid travel will be described below with reference to FIG. 5. If the present SOC is less than the lower control limit value of the usable SOC, step S222 is executed so that the vehicle is driven in the constant SOC mode.

After execution of steps S214, S220 and S222, step S216 is executed. At step S216, it is checked whether the vehicle has arrived at the next external charge point. If the determination is NO, the processing returns to step S202. As long as the vehicle is traveling toward the next external charge point, the estimated EV travelable distance Lp and the remaining distance Ln are compared from time to time so that the travel mode is selected in accordance the comparison result. If the determination at step S216 is YES, this control routine is terminated. This control routine is executed again from the first step (step S200) after an elapse of a predetermined time interval.

The processing of calculating the minimum travel cost Skmin acquired at step S202 of FIG. 2 will be described next with reference to FIG. 3. The processing shown in FIG. 2 is executed at the same time in parallel to the processing shown in FIG. 2 by using time sharing processing or the like. The total processing (steps S300 to S320) shown in FIG. 3 corresponds to a travel cost learning section.

Figure 3:
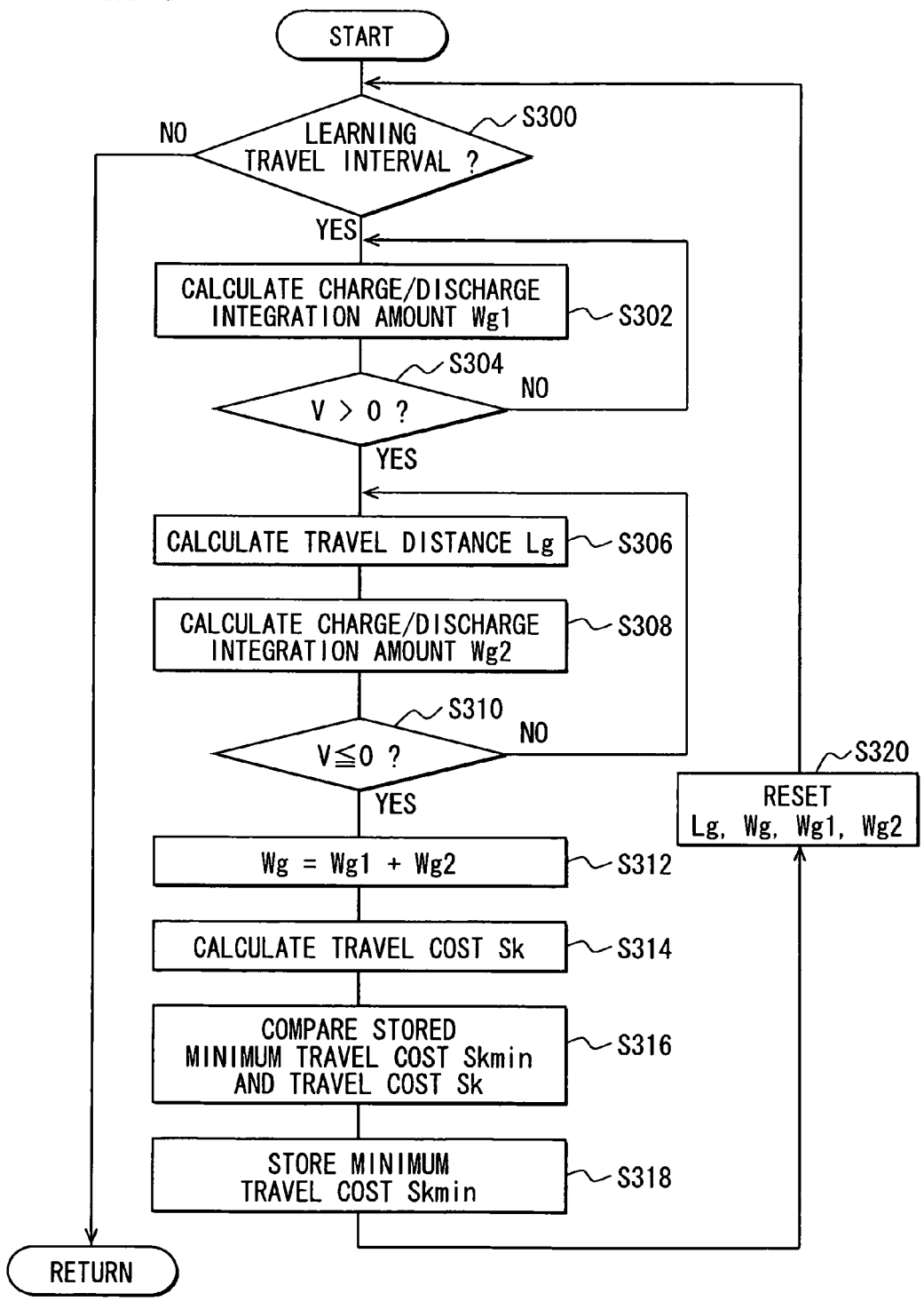
FIG. 3 is a flowchart showing processing of calculating minimum travel cost acquired at processing (S202) of FIG. 2.

In FIG. 3, it is checked first at step S300 whether the present position is within the learning travel interval. This learning travel interval is an interval, which ends at the external charge point. If a guidance route, which has the external charge point as the destination, has been set in the navigation device 30, the learning travel interval indicates an interval, which corresponds to a total of the guidance route or a part thereof within a predetermined range from the external charge point. The learning travel interval may be inputted by a driver in advance. If the interval near the external charge point is inputted, the travel mode can be selected more appropriately when the vehicle travels near the external charge point.

If it is determined at step S300 that the vehicle is not within the learning travel interval, this processing is ended. If it is determined that the vehicle is within the learning travel interval, step S302 is executed. At step S302, an integration value of charge/discharge electric power amounts of the battery 6 is calculated as a first charge/discharge integration value Wg1. It is checked at next step S304 whether the vehicle travel speed is greater than zero, that is, positive. If the determination is NO, step S302 is repeated. Thus, the first charge/discharge integration value Wg1 is the charge/discharge electric power integration value of the battery 6 before the vehicle starts to travel, that is, while the vehicle is at rest. This integration value Wg1 indicates the amount of electric power consumed by accessory devices, that is, electric loads 16, during the stop of travel.

If it is determined at step S304 that the vehicle travel speed has become greater than zero, that is, the vehicle has started to travel, step S306 is executed. At step S306, a travel distance Lg [km] after the vehicle has started traveling is calculated by acquiring information from the navigation device 30. At next step S308, the integration value of the charge/discharge electric power amounts of the battery 6 is calculated as a second charge/discharge integration value Wg2. It is checked at next step S310 whether the vehicle travel speed V has fallen below zero, that is, whether the vehicle has stopped. If the determination is NO, step S306 is repeated. The second value Wg2 is therefore the integration value of charge/discharge electric power of the battery from the start of travel to the stop of travel of the vehicle.

If it is determined at step S310 that the travel speed has fallen to zero, step S312 is executed. At step S312, by adding the first charge/discharge integration value Wg1 and the second charge/discharge integration value Wg2, a charge/discharge integration value Wg [kWh] is calculated as an integration value of charge/discharge of the battery during a period from the stop to the next stop of the vehicle through the start and travel.

At next step S314, the charge/discharge integration value Wg calculated at step S312 is used as the charge/discharge integration value Wg of a case, in which the vehicle is assumed to be driven in the electric motor travel mode from the stopping of last time to the stopping next time. Based on the following equation Eq. 2, a travel cost Sk is calculated from the charge/discharge integration value Wg and the travel distance Lg calculated at step S306. This travel cost Sk indicates the amount of electric power of the battery 6, which is consumed by the vehicle to travel a unit distance.

$$Sk = Wg/Lg \quad (Eq. 2)$$

In some cases, the SOC of the battery 6 reaches the upper control limit value of charge during travel and, as a result, the regenerative electric power generated at the deceleration time cannot be charged to the battery 6. If the second charge/discharge integration value Wg2 is used directly, the travel cost Sk cannot be calculated correctly. For this reason, in case that the regenerative electric power cannot be charged to the battery 6 at the time of deceleration, the regenerative electric power is estimated based on the demand drive torque for the axle 15, which is determined in accordance with the vehicle travel speed V, the accelerator position Acc and the brake signal Sb.

At the following step S316, the minimum travel cost Skmin, which has been stored as that at the external charge point corresponding to the end of the learning travel interval, and the travel cost Sk calculated at step S314 are compared. At next step S318, one of the costs determined to be smaller one as a result of comparison at step S316 is stored as a new minimum travel cost Sk for the external charge point corresponding to the end of the learning travel interval. It is understood from the equation Eq. 2 that the vehicle travels a unit distance with less electric power as the travel cost Sk is smaller. The minimum travel cost Skmin therefore indicates the travel cost Sk, with which the vehicle could have traveled the unit distance by consuming the least electric power ever.

After execution of step S318, the travel distance Lg, the first charge/discharge integration value Wg1 and the second charge/discharge integration value Wg2 are reset at step S320 and returns to step S300 to repeat the foregoing processing.

The minimum cost Skmin calculated in the processing shown in FIG. 3 is acquired at step S202 of FIG. 2 and used to calculate the estimated EV travelable distance Lp. The minimum cost Skmin is used in calculation of the estimated EV travelable distance Lp for the following two reasons.

The first reason is to restrict the SOC at the time of arrival at the next external charge point from becoming higher than the usable lower control limit value SOC. If the travel cost Sk in the actual travel becomes less than the travel cost Sk used in the calculation of the estimated EV travelable distance Lp, the estimated EV travelable distance Lp becomes shorter than the distance, which the vehicle can actually travel by the electric motor travel. In this case, step S214 of FIG. 2 is executed and the distance of electric motor travel is shortened. As a result, the vehicle will arrive at the next external charge point before the actual SOC falls to the usable lower control limit value SOC. It thus becomes impossible to maximize the amount of charge at the next external charge point.

The second reason is to reduce the volume of stored information due to storage of only the minimum travel cost Skmin.

It is noted that the minimum travel cost Skmin is stored with respect to one external charge point. One minimum cost Skmin is determined with respect to the same external charge point irrespective of travel routes and the estimated EV travelable distance Lp is calculated by using this minimum cost Skmin. For this reason, when the vehicle travels toward the external charge point with respect to which the minimum travel cost Skmin has been set, it becomes possible to calculate the estimated EV travelable distance Lp and select the travel mode based on such an estimated EV travelable distance Lp irrespective of the travel route and the position of the vehicle.

It is of course possible to store the minimum travel cost Skmin for each of the travel route, even if the travel routes having respective ends at the same external charge point. It is also possible to use the travel cost Sk as calculated at step S314 without determining the minimum travel cost Skmin.

It is further possible to average the travel costs calculated in each travel if the vehicle has traveled the same learning travel interval a plurality of times. In the foregoing examples, a travel interval from the stop of the vehicle to the next stop is used as a unit of calculation of the travel cost Sk, that is, a unit interval. It is however possible to set the distance as a unit of calculation so that the travel cost Sk may be calculated each time the vehicle travels an interval between adjacent intersections or a predetermined fixed distance. In case of using the distance or the interval as the unit of calculation, the user may pre-register such a distance or interval. If the travel cost Sk is stored by dividing the travel route to the next external charge point into a plurality of areas, the estimated EV travelable distance Lp is calculated by using the travel cost Sk corresponding to the actual travel point based on the stored travel costs Sk stored with respect to each interval.

The control processing (step S214 of FIG. 2) at the time of electric motor travel will be described next with reference to FIG. 4.

At step S400, the demand drive power Pw, which the axle 15 demands, is set. Specifically, the demand drive torque Tw is set based on the accelerator position Acc, the brake signal Sb and the shift position signal Ps by using a pre-stored demand drive torque determination map. The rotation speed of the axle 15 is calculated based on the vehicle travel speed SSp and multiplied by the demand drive torque Tw thereby to set the product as the demand drive power Pw.

It is checked at step S402 whether the demand drive power Pw calculated at step S400 is equal to or greater than zero. If the demand drive power Pw is negative (NO at step S402), regenerative braking is performed because the vehicle is decelerating.

Specifically, the engine command power is set as Pe=0 at step S404, the MG command power is set as Pmg1=0 at step S406 and the demand drive power Pw set at step S400 is set as the MG2 command power Pmg2 at step S408. At step S418 after executing step S408, the engine command power Pe set at step S404 is outputted to the engine control ECU 26, and the MG1 command power Pmg1 set at step S406 and the MG2 command power Pmg2 set at step S408 are outputted to the MG control ECU 20, respectively.

The electric power generated from the second motor/generator MG2 by the regenerative braking is supplied to the power source system through the second inverter 10 and the electric power transfer cable 18. Although the electric power supplied to the electric power source system is stored in the battery 6, a part of its electric power may be consumed by the electric loads 16.

If the determination at step S402 is YES, that is, the demand drive power Pw is zero or positive, it is checked at step S410 whether the demand drive power Pw is greater than the maximum drive power of the second motor/generator MG2. If it is determined that the demand drive power Pw does not exceed the maximum drive power of the second motor/generator MG2, the engine command power is set as Pe=0 at step S412, the MG1 command power is set as Pmg1=0 at step S414 and the demand drive power Pw set at step S400 is set as the MG2 command power Pmg2 at step S416. At step S418 after executing step S416, the engine command power Pe set at step S412 is outputted to the engine control ECU 26, and the MG1 power Pmg1 and the MG2 power Pmg2 set at steps S414 and S416 are outputted to the MG control ECU 20, respectively.

If it is determined at step S410 that the demand drive power Pw is equal to or greater than the maximum drive power of the second motor/generator MG2, the command power Pmg2 of the second motor/generator MG2 is set as the MG2 maximum drive power. The engine command power Pe and the MG1 command power Pmg1 are set (steps S422 and S424) so that the insufficient demand drive power Pl (Pl=Pw−Pmg2) is transferred from the engine 1 to the axle 15. At step S418 after executing step S424, the engine command power Pe set at step S422 is outputted to the engine control ECU 26, and the MG1 command power Pmg1 and the MG2 command power Pmg2 set at steps S424 and S420, respectively, are outputted to the MG control ECU 20. After executing step S418, the processing returns to the processing (S216) of FIG. 2.

The control processing (step S220 of FIG. 2) at the hybrid travel time will be described with reference to FIG. 5.

Figure 4:
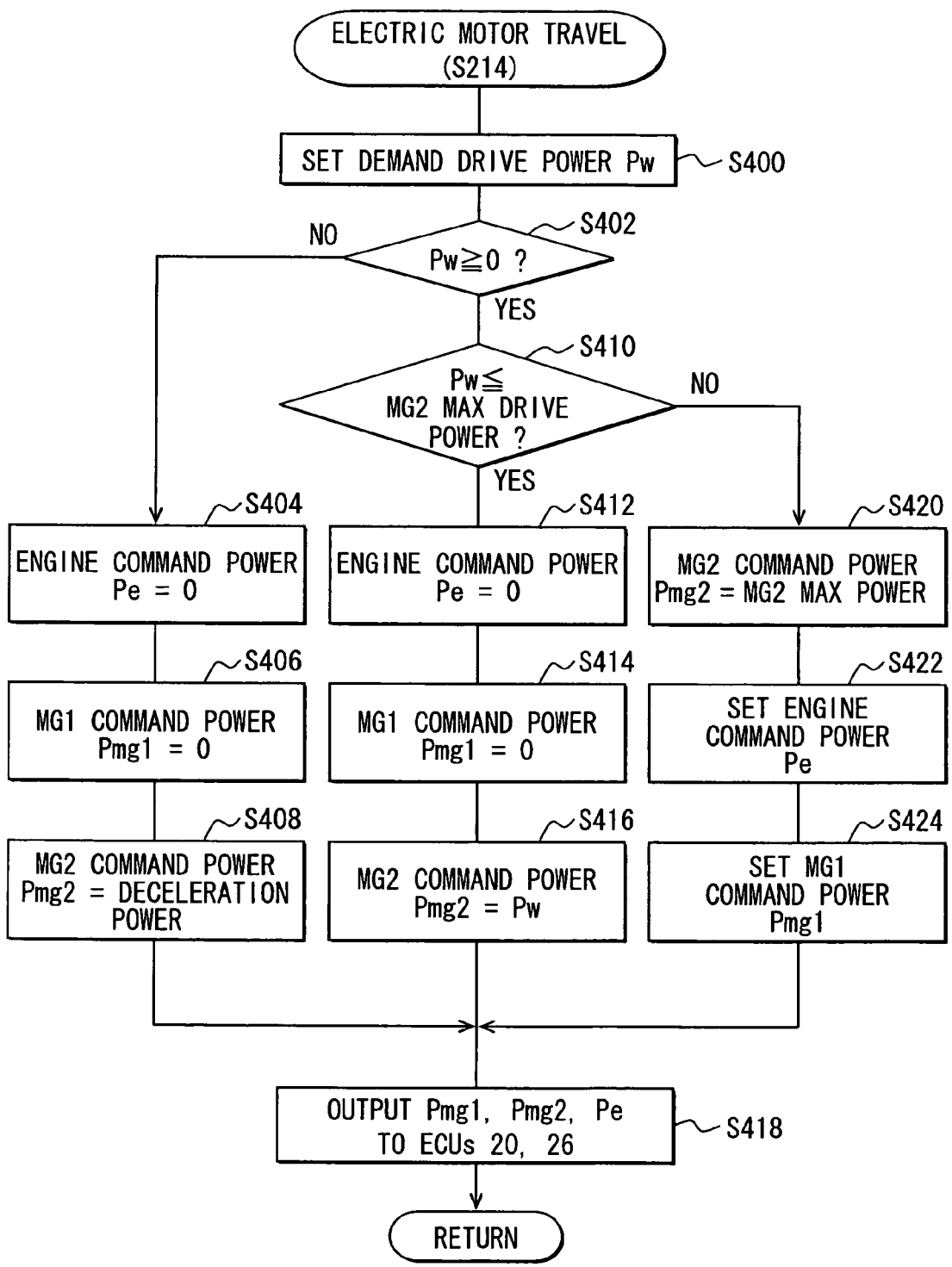
FIG. 4 is a flowchart showing processing (S214) of control in an electric motor travel time in detail.

At step S500, the demand drive power Pw, which the axle 15 demands, is set in the similar manner as in step S400 of FIG. 4. It is checked at the following step S502 whether the demand drive power Pw calculated at step S500 is equal to or greater than zero. If the demand drive power Pw is negative (No at step S502), steps S504, S506 and S508 are executed. The processing at these steps S504, S506 and S508 are the same as that at steps S404, S406 and S408 of FIG. 4, respectively.

If the determination at step S502 is YES, that is, the demand drive power Pw is equal to or greater than zero, step S510 and subsequent steps are executed. At step S510, an amount of fuel consumed by the engine 1 per unit time (for example, 1 second) in case that the demand drive power Pw set at step S500 is generated only by the engine, assuming that the electric power transfer amount EPw with the electric power source system is zero. This amount of fuel is set as the basic fuel consumption amount Fbase. The details of calculation of the basic fuel consumption amount Fbase will be described below.

At step S512, an economic index, that is, an assist economic index Dassi[i], which satisfies the demand drive power Pw set at step S500, is set. This economic index is set based on the power of the engine 4 and the power produced by rotation of the motor/generators MG1 and MG2 with the electric power supplied to either one of the motor/generators MG1 and MG2 from the electric power source system. The detail of setting the assist economic index Dassi[i] is described below with reference to FIG. 7. Here, [i] is a natural number from 1 to n1. N1 indicates points, at which the assist economic index Dassi is calculated.

At the following step S514, an economic index, that is, an electric power generation economic index Dgen[i], is set. This economic index is set assuming that the electric power Pw is generated as well by the motor/generator MG1 driven by the engine 4 and the generated electric power is supplied to the electric power source system. The detail of setting the electric power generation economic index Dgen[i] will be described below with reference to FIG. 8.

The assist economic index Dassi[i] set at step S512 and the electric power generation economic index Dgen[i] are compared with respective reference values to set an optimum economic index Dopt and to set also an electric power transfer amount (optimum electric power transfer amount) EPwopt corresponding to the optimum economic index Dopt. The detail of setting the optimum economic index Dopt and the optimum electric power transfer amount EPwopt will be described below with reference to FIG. 9.

At steps S518, S520 and S522, the operation points of the engine 4 and the motor/generators MG1 and MG2 corresponding to the optimum electric power transfer amount EPwopt. At step S526, the command values set at steps S504 to S508 or the operation points set at steps S518 to S522 are outputted to the engine control ECU 26 and the MG control ECU 20, respectively. After executing step S526, the processing returns to the processing of FIG. 2.

The processing of steps S510 to S516 is described in detail. The processing of step S510 is described in detail with reference to FIG. 6. At step S600 in FIG. 6, the electric power transfer amount EPw with the electric power source system is assumed to be zero. That is, the current, which flows in the electric power transfer line 18, is assumed to be zero. The candidate of the engine operation point (that is, engine rotation speed Ne and engine torque Te) in the case of outputting the demand drive power Pw by only the engine 4 is calculated as the basic engine operation point candidate (Ne0[i], Te0[i]). Here, [i] is a natural number from 1 to n2. N2 may be set to a fixed number or all of them may be calculated.

In calculation of the basic engine operation point candidates, the energy conversion efficiency of the motor/generators MG1 and MG2 and the mechanical loss in the power transfer path may also be taken into account. The conversion efficiency and the mechanical loss are predetermined empirically in advance. In place of the calculation, the basic engine operation point candidate (Ne0[1], Te0[i]) may be determined based on a map, which is pre-stored and defines the basic engine operation candidates (Ne[i], Te0[i]) relative to the demand drive power Pw.

At step S602, a fuel consumption amount per unit time is calculated with respect to each basic engine operation point candidate (Ne0[i], Te0[i]) calculated at step S600. In the calculation of the fuel consumption amount, a pre-stored map defining the relation between the engine operation points and the fuel consumption amount. The minimum value of the calculated fuel consumption amounts is stored as the basic fuel consumption amount Fbase.

The processing of step S512 will be described in detail with reference to FIG. 7. At step S700 of FIG. 7, electric power consumed within the electric power source system per unit time is calculated based on the current and voltage within the in-system electric power supply line 19.

At step S702, the maximum electric power amount (maximum suppliable electric power amount) is determined based on the electric power consumed within the electric power source system calculated by step S700 and the SOC at that time.

At step S704, the electric power, which is required to be supplied from the electric power source system to the motor/generator MG2 if the demand drive power Pw is produced by only the motor/generator MG2, is calculated as the maximum required electric power amount.

At step S706, the electric power amount (assist electric power amount) EPwassi[i] supplied from the electric power source system to the motor/generator MG under a condition that it is less than the maximum suppliable electric power amount determined at step S702 and less than the maximum required electric power amount calculated at step S704 is determined. Here, [i] is a natural number between 1 and n1. N1 may be a fixed number or may be a number determined by a predetermined interval to set the assist electric power electric power transfer amount EPwassi from zero to maximum suppliable electric power amount (or maximum required electric power).

At step S706, the engine operation point candidate (Neassi[i], Teassi[i]) is calculated in the similar manner as in step S600 of FIG. 6, assuming that each assist electric power electric power transfer amount EPwassi[i] is supplied to the motor/generator MG to rotate the motor/generator MG and the drive power of rotation is transferred to the axle 15 and that the engine 4 generates the remaining demand drive power Pw. This engine operation point candidate is referred to as an assist engine operation point candidate. If there is a plurality of assist engine operation point candidates for one assist electric power electric power transfer amount EPwassi[i], the fuel consumption amount is calculated for each assist engine operation point in the similar manner as in step S600 of FIG. 6. The smallest one of the calculated fuel consumption amounts is set as the assist engine operation point candidate (Neassi[i], Teassi[i]), which corresponds to the assist electric power electric power transfer amount EPwassi[i].

At step S708, a fuel consumption amount per unit time (assist-time fuel consumption amount) Fassi[i] is calculated with respect to each assist engine operation point (Neassi[i], Teassi[i]) calculated at step S706. This assist-time fuel consumption amount Fassi[i] is calculated based on a pre-stored map defining the relation between an engine operation point and a fuel consumption amount in the similar manner as in step S602.

At step S710, an assist economic index Dassi[i] are calculated based on the following equation Eq. 3 by using the assist electric power electric power transfer amount EPwassi[i] corresponding to the assist-time fuel consumption amount Fassi[i] and the basic fuel consumption amount Fbase set at step S602 of FIG. 6 relative to the assist-time fuel consumption amount Fassi[i] calculated at step S708.

$$Dassi[i]=(Fassi[i]-Fbase)/EPwassi[i] \quad (Eq. 3)$$

As understood from the right side of the equation Eq. 3, the assist economic index Dassi[i] is a ratio of decrease of the fuel consumption amount relative to the electric power electric power transfer amount EPwassi[i]. Therefore, the fuel consumption amount can be reduced more efficiently as the absolute value of the assist economic index Dassi[i] is greater. The assist electric power electric power transfer amount EPwassi[i] is a negative value.

The processing of step S514 is described in detail with reference to FIG. 8. Step 800 of FIG. 8 is similar to step S700 of FIG. 7 and for calculation of the electric power consumed within the electric power source system. The result of step S700 of FIG. 7 may be used in place of calculation of the same.

At step S802, the amount of electric power, which the battery 6 can receive from the present SOC until it is fully charged. Further, the maximum amount of electric power (maximum receivable electric power amount), which the electric power source system can receive, is determined based on the determined electric power amount and the electric power consumed within the electric power source system calculated at step S800.

At step S804, the amount of electric power (electric power generation amount) EPwgen[i] generated by the motor/generator MG1 rotated by the drive power of the engine 4, under a condition that the received electric power amount is less than the maximum receivable electric power amount determined at step S802. Here, [i] is a natural number from 1 to n2. N2 may be a fixed number or may be a number, which is determined by setting the electric power generation amount EPwgen from zero to the maximum receivable electric power amount at a predetermined interval.

At step S804, the operation point candidate (Negen[i], Tegen[i]) of the engine 4 is calculated in the same manner as in step S600 of FIG. 6. This operation point candidate is a point, which satisfies the demand drive power Pw under a condition that the motor/generator MG1 or MG2 is driven to generate each electric power generation amount EPwgen[i]. This engine operation point candidate is referred to as an electric power generation operation point candidate. If there is a plurality of generation engine operation point candidates relative to one electric power generation amount EPwgen[i], in the similar manner as step S600 of FIG. 6, the fuel consumption amount is calculated for each generation engine operation point candidate and the smallest one of the fuel consumption amounts is set as the generation engine operation point candidate (Negen[i], Tegen[i]) for the electric power generation amount EPwgen[i].

At the following step S806, a fuel consumption amount per unit time (electric power generation-time fuel consumption amount) Fgen[i] is calculated for each generation engine operation point candidate (Negen[i], Tegen[i]) calculated at step S804. A pre-stored map defining a relation between the engine operation point and the fuel consumption amount is used in calculation of the electric power generation-time fuel consumption amount Fgen[i] in the similar manner as in step S602.

At step S808, electric power generation economic indexes Dgen[i] are calculated based on the following equation Eq. 4 by using the electric power generation amount EPwgen[i] corresponding to the electric power generation-time fuel consumption amount Fgen[i] and the basic fuel consumption amount Fbase set at step S602 of FIG. 6 relative to the electric power generation-time fuel consumption amount Fgen[i] calculated at step S806.

$$Dgen[i]=(Fgen[i]-Fbase)/EPwgen[i] \quad (Eq. 4)$$

As understood from the right side of the equation Eq. 4, the electric power generation economic index Dgen[i] is a ratio of increase of the fuel consumption amount relative to the electric power generation amount EPwgen[i], which the motor/generator MG1 or MG2 generates. Therefore, the fuel consumption amount can be reduced more efficiently as the absolute value of the electric power generation economic index Dgen[i] is smaller. Dgen[i] becomes zero at the time of regenerative braking, because the fuel consumption amount is not increased due to the electric power generation amount EPwgen[i].

The processing at step S516 is described in detail with reference to FIG. 9. At step S900, an amount of improvement in the fuel economy relative to the assist economic index Dassi[i], that is, assist-time improvement amount Kassi, is calculated by substituting each assist economic index Dassi[i] set at step S512 of FIG. 5 into the following equation Eq. 5.

$$Kassi=Dassi[i]-STassi \quad (Eq. 5)$$

In equation Eq. 5, STassi is a reference value and common for all assist economic indexes Dassi[i]. This reference value STassi is preset by designers in accordance with the remaining distance Ln to the next external charge point. The electric power generation becomes more likely to be selected as the assist-time improvement amount Kassi becomes smaller. The electric power generation becomes less likely to be selected as the assist-time improvement amount Kassi becomes larger.

Figure 5:
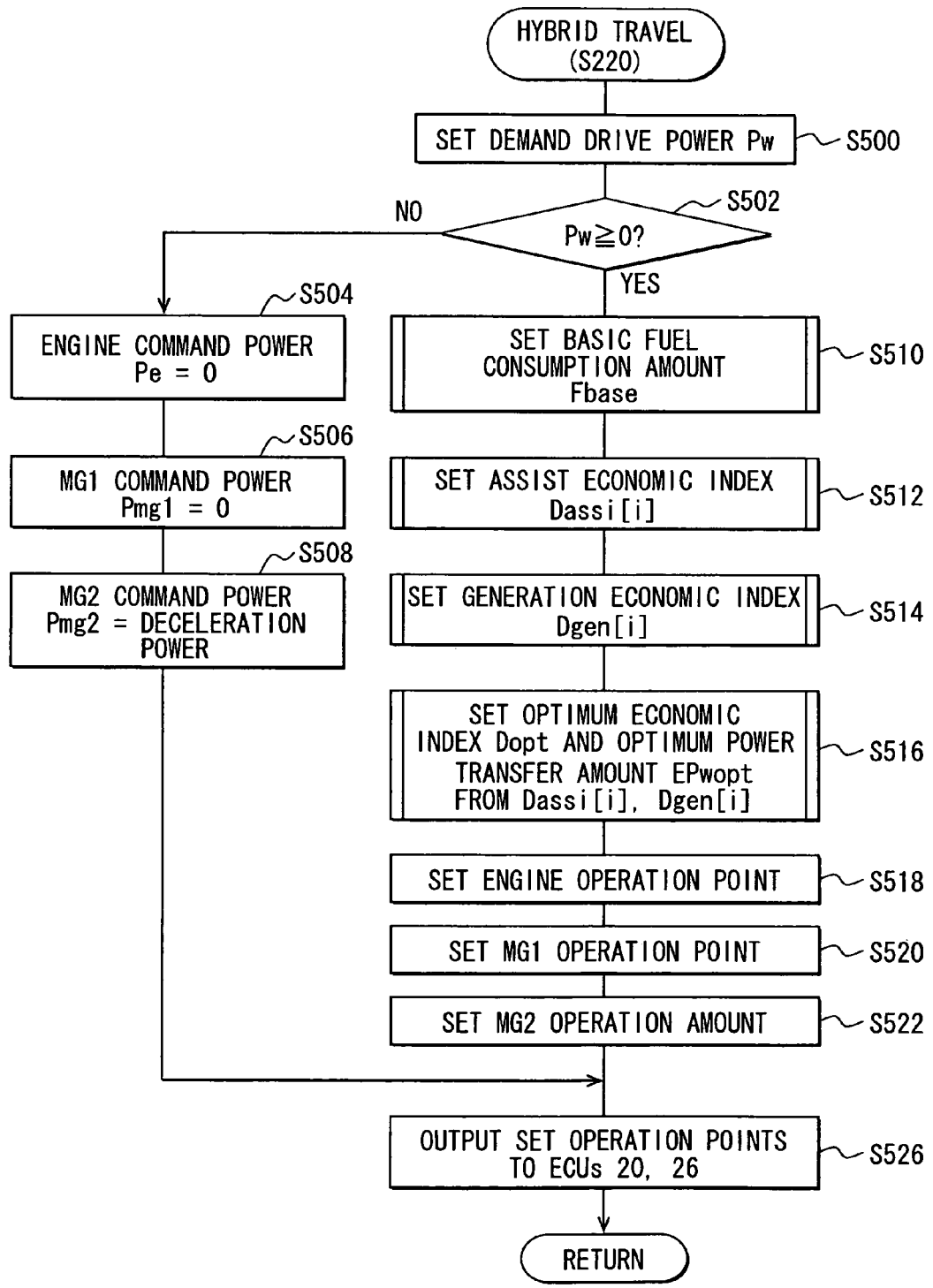
FIG. 5 is a flowchart showing processing (S220) of control in a hybrid travel time in detail.

At step S902, an amount of improvement in fuel economy, that is, electric power generation-time improvement amount, Kgen relative to the electric power generation economic index Dgen[i] is calculated by substituting each electric power generation economic index set at step S514 of FIG. 5 into the following equation EQ. 6.

$$Kgen=STgen-Dgen[i] \quad (Eq. 6)$$

In equation Eq. 6, STgen is a reference value and is also common for all the electric power generation economic indexes Dgen[i]. This reference value STgen is preset by a designer in accordance with the remaining distance Ln to the next external charge point. The electric power generation becomes more likely to be selected as the electric power generation-time improvement amount Kgen becomes greater. The electric power generation becomes less likely to be selected as the electric power generation-time improvement amount Kgen becomes smaller. The reference value STgen is set to be lower near the fully-charged SOC. For this reason, the electric power generation-time improvement amount Kgen becomes smaller near the fully-charged SOC so that excessive charge is avoided.

At next step S904, one of improvement amount, which is positive and maximum, is selected from among all the improvement amounts K calculated at steps S900 and S902. The economic index D, which corresponds to the selected maximum improvement amount K is determined to be an optimum economic index Dopt.

At step S906, an electric power transfer amount EPw for the optimum economic index Dopt determined at S904 is determined by using a pre-stored relation between an economic index D and an electric power transfer amount EPw. This determined electric power transfer amount EPw is set as the optimum electric power transfer amount EPwopt. If none of the improvement amounts K calculated at S900 and S902 is positive, the optimum electric power transfer amount EPwopt is set to zero.

Figure 10:
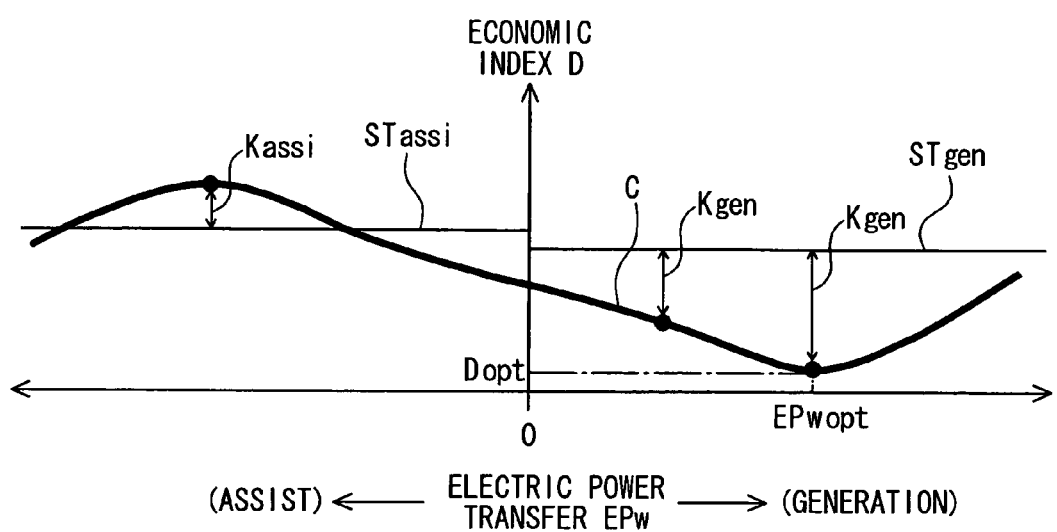
FIG. 10 is a graph showing a relation between an economic index and an electric power transfer amount.

The relation between the economic index D and the electric power transfer amount EPw is shown in FIG. 10 as an example. In FIG. 10, if the electric power transfer amount EPw is zero, electric power is transferred between the electric power source system and the motor/generator MG. The left side from the zero point indicates the assist condition, in which the electric power is transferred from the electric power source system to the motor/generator MG. The right side from the zero point indicates the electric power generation condition, in which the electric power is transferred from the motor/generator MG to the electric power source system.

In the example of FIG. 10, the economic index D becomes the optimum economic index Dopt when a relational curve C is the local minimum value, and the electric power transfer amount EPw at that time becomes the optimum electric power transfer amount EPwopt. Therefore, according to this example, it is most economical (that is, fuel consumption can be minimized) to supply the electric power of EPwopt to the electric power source system by driving the motor/generator MG1 to generate electric power.

After thus setting the optimum electric power transfer amount EPopt, the operation point of the engine and the operation points of the motor/generators MG1 and MG2 corresponding to the optimum electric power transfer amount EPwopt are outputted to the engine control ECU 26 and the MG control ECU 20, respectively, at steps S518, S520, S522 and S526 as described above.

As described above, during the hybrid travel, the electric power consumed within the electric power source system is calculated successively, and the assist-time fuel consumption amount Fassi[i] and the electric power generation-time fuel consumption amount Fgen[i] are calculated in consideration of the calculated electric power. The assist economic index Dassi[i] is calculated from the assist-time fuel consumption amount Fassi[i] calculated in consideration of the electric power consumed within the electric power source system. Further the electric power generation economic index Dgen[i] is calculated from the generation-time fuel consumption amount Fgen[i] calculated in consideration of the electric power consumption within the electric power source system. Since these economic indexes Dassi[i] and Dgen[i] reflect variations in the electric power consumed within the electric power source system, the economic indexes can be acquired with high accuracy irrespective of the electric power consumption within the electric power source system. Since the assist travel and the power generation travel are performed based on these economic indexes, the fuel economy can be improved further.

It is noted that, in the equation Eq. 3 for calculating the assist economic index Dassi and the equation Eq. 4 for calculating the generation economic index Dgen, the numerator and the denominator may be reversed. In this case, the fuel consumption amount can be decreased more as such economic indexes D become smaller.

Figure 11:
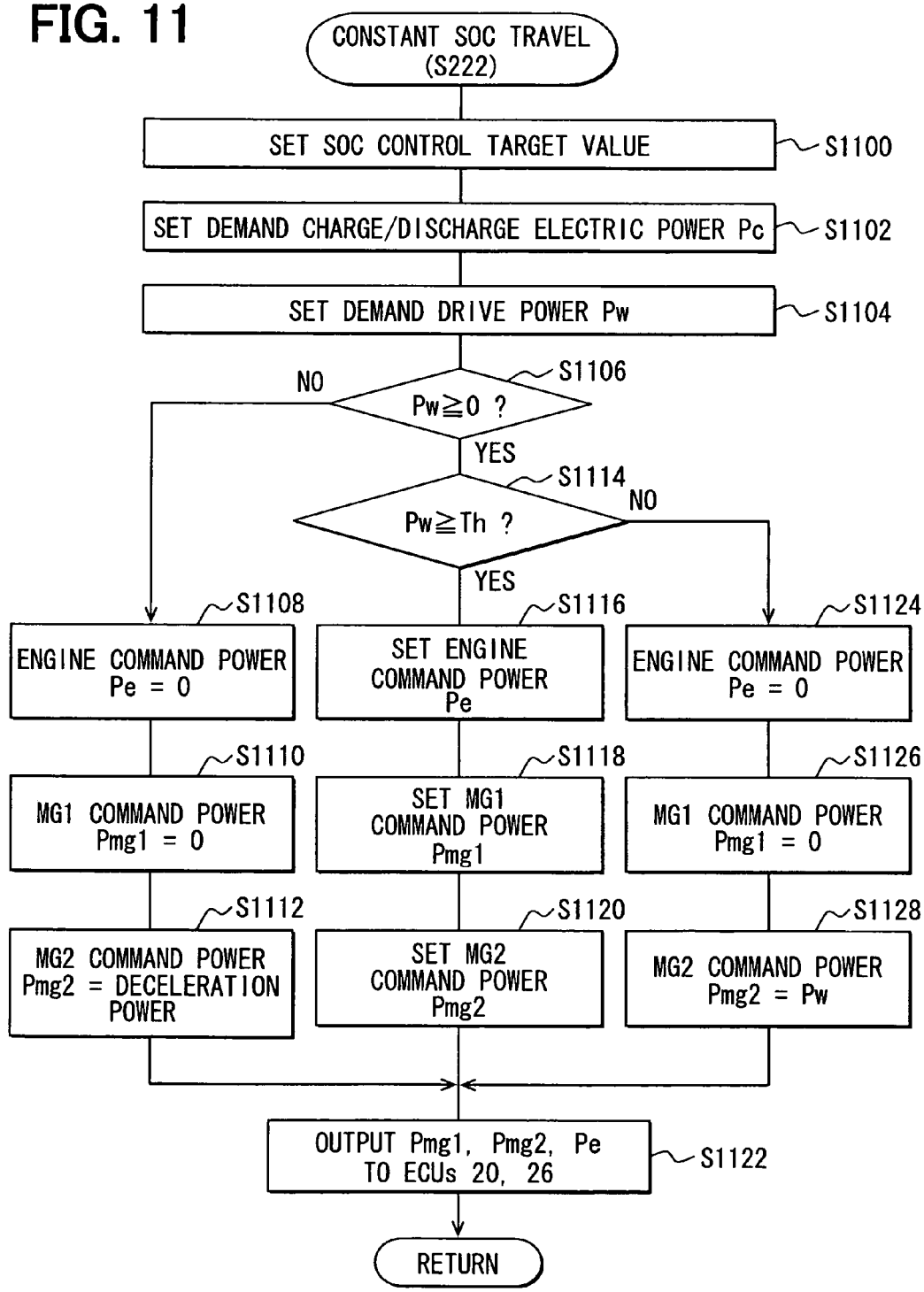
FIG. 11 is a flowchart showing processing (S222) of control under a constant SOC travel time.

The control processing for the constant SOC travel (step S222 of FIG. 2) is described next with reference to FIG. 11.

Figure 12:
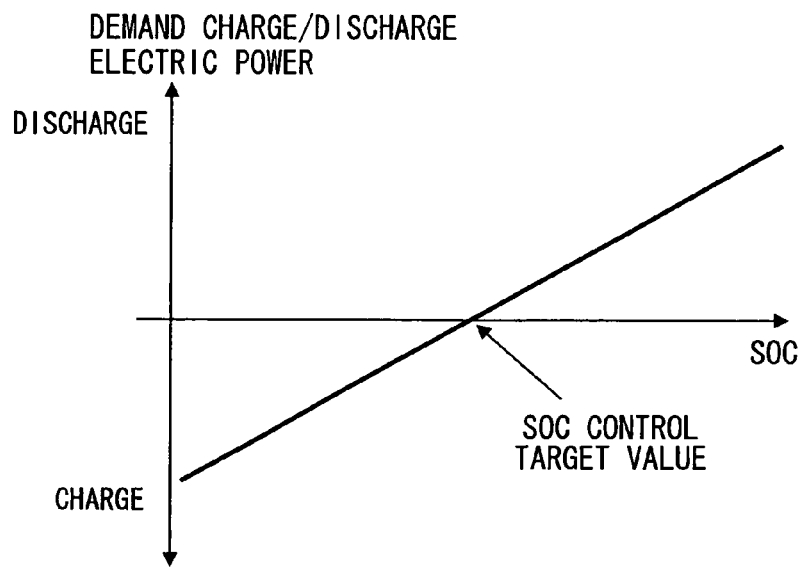
FIG. 12 is a graph showing an example of a demand electric charge/discharge power set in FIG. 11.

First at step S1100, a SOC control target value is set. The SOC control target value is a usable SOC lower control limit value for example. At step S1102, a demand charge/discharge electric power Pc of the battery 6. This demand charge/discharge electric power Pc is determined to reduce the deviation of the present SOC from the SOC control target value. One example of its determination is shown in FIG. 12. In FIG. 12, the charge demand is increased when the present SOC is lower than the SOC control target value, and the discharge demand is increased when the present SOC is higher than the SOC control target value.

At step S1104, the demand drive power Pw is calculated in the same manner as the electric motor travel time or the hybrid travel time. It is checked at step S1106 whether the demand drive power Pw is equal to or greater than zero. If the demand drive power Pw is negative (NO at step S1106), regenerative braking is performed (steps S1108, S1110, S1112 and S1122) because the vehicle is decelerating. The processing at steps S1108, S1110, S1112 and S1122 is the same as steps S404, S406, S408 and S418 of FIG. 4.

If the determination at step S1106 is YES, that is, the demand drive power Pw is zero or positive, it is checked at step S1114 whether the demand drive power Pw is greater than a threshold value Th. The threshold value Th is for determining whether the vehicle should travel with the demand drive power Pw supplied by the drive power of only the second motor/generator MG2 or of both motor/generators MG1 and MG2. This threshold value Th is predetermined. The threshold value Th is set so that the vehicle travels with lower fuel consumption. Specifically, even when the vehicle travels at the constant SOC, the vehicle is driven by the drive power of only the second motor/generator under a condition that the demand drive power is low where the engine efficiency is not good.

If it is determined at step S1214 that the demand drive power Pw is less than the threshold value Th, the engine command power is set as Pe=0, the MG1 command power is set as Pmg1=0, the demand drive power Pw is set as the MG2 command power Pmg2 and these command powers are outputted to the engine control ECU 26 and the battery monitor ECU 22 (steps S1124, S1126, S1128 and S1122).

If it is determined at step S1124 that the demand drive power Pw is equal to or greater than the threshold value Th, the engine command power Pe, the MG1 command power Pmg1 and the MG2 command power Pmg2, which can supply the demand drive power Pw and the demand charge/discharge electric power Pc, are calculated in the conventional manner, and these command powers are outputted to the engine control ECU 26 and the ECU 20 (steps S1116, S1118, S1120 and S1122).

Figure 13:
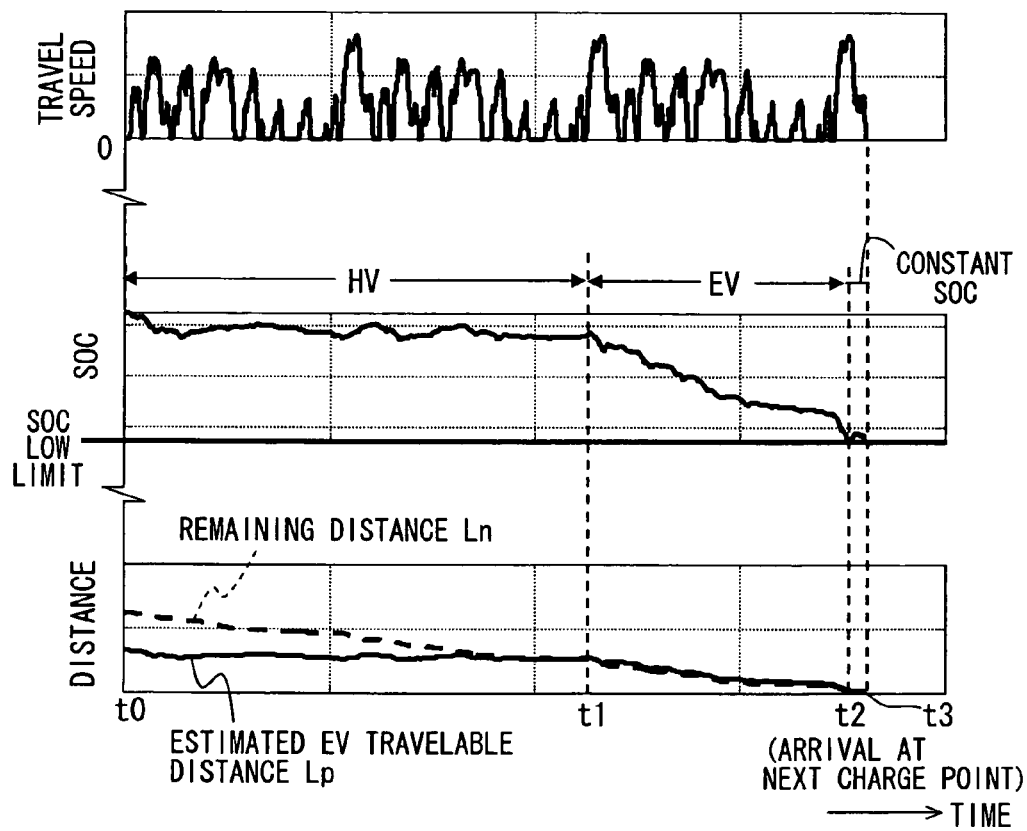
FIG. 13 is a time chart showing an example of changes of a travel mode of a hybrid vehicle.

One example of travel mode changes of the hybrid vehicle 1 according to the present embodiment is shown in FIG. 13. Time t1 indicates a time point, at which the estimated EV travelable distance Lp and the remaining distance Ln to the next external charge point become equal to each other. Time t2 indicates a time point, at which the actual SOC falls to the SOC usable lower limit. Time t3 indicates a time point, at which the vehicle arrives at the next external charge point.

As shown in the lowermost diagram, the estimated EV travelable distance Lp is shorter than the remaining distance Ln to the next external charge point during a time period from time t0 to time t1. As shown in the middle diagram, the SOC is higher than the SOC usable lower control limit value during the period from time t0 to time t1. During this period, therefore, the determination at step S210 in FIG. 2 is NO and the determination at step S218 is YES. As a result, as shown in the middle diagram, the hybrid travel is performed and the battery 6 is charge/discharge-controlled so that the electric power transfer amount EPw calculated from the economic index D may be attained.

From time t1 to time t2, the electric motor travel is performed because the determinations at steps S210 and S212 in FIG. 2 are both YES. After time t2, that is, after the actual SOC has once fallen below the SOC usable lower control limit value, the constant SOC travel is performed until time t3, at which the vehicle arrives the next external charge point.

According to the present embodiment described above, the remaining distance Ln to the next external charge point and the estimated EV travelable distance Lp are compared. If the estimated EV travelable distance Lp is greater than the remaining distance Ln, the electric motor travel mode is selected because it is estimated that the vehicle can travel to the next external charge point under the electric motor travel mode. In this electric motor travel mode, the motor/generator MG is not driven by the engine 4 to rotate for electric power generation. Therefore, it is less likely that the motor/generator MG is driven to rotate for electric power generation in comparison with that disclosed in patent document 2, in which the motor/generator is driven by the power of the engine for electric power generation and charging is performed by the generated electric power, when the actual SOC falls below the control lower control limit value at each time. Thus, the fuel consumption amount and the exhaust emission amount can be reduced more.

The present invention is not limited to the disclosed embodiment, and the present embodiment may be modified in various ways.

For example, if step S210 of FIG. 2 is NO after step S214 of FIG. 2 has once been executed, check at step S218 may be skipped and the constant SOC travel may be performed. Further, the constant SOC travel may be performed until the vehicle arrives at the next external charge point without executing the processing of FIG. 2 after having selected the constant SOC travel once.

The remaining distance to the next external charge point may be calculated based on an initial remaining distance, which a user inputs, and a distance of travel of the vehicle 1 after input of the initial remaining distance.

Although the vehicle 1 is assumed to be the series-parallel type hybrid vehicle, it may be other types (series type and parallel type) of hybrid vehicles.

What is claimed is:

1. A control apparatus for drive power generators of a hybrid vehicle, which include an internal combustion engine and a rotary electric machine as drive power generators for generating power to drive a drive shaft of the vehicle, a charge storage device for transferring electric power to and from the rotary electric machine, and an external electric power input device for receiving electric power from an external power source external to the vehicle and charging the charge storage device with received electric power, the control apparatus comprising:

a remaining distance calculation section that calculates a remaining distance to a next external charge point, at which electric charging is possible by the external power source;

an electric motor travelable distance estimation section that estimates an electric motor travelable distance, which is a travelable distance attained by the vehicle when traveling in an electric motor travel mode by stopping the internal combustion engine and supplying the electric power from the charge storage device to the rotary electric machine used as the power generator; and a travel mode selection section that compares the remaining distance and the electric motor travelable distance to select the electric motor travel mode and an internal combustion engine travel mode based on a comparison result indicating that the vehicle can and cannot travel to the next external charge point in the electric motor travel mode, respectively, the engine travel mode using the internal combustion engine as the power generator;

wherein:

the internal combustion engine travel mode includes a constant remaining capacitance travel mode, in which the internal combustion engine and the rotary electric machine are usable as the power generators and the vehicle travels while maintaining a target value of the remaining capacity of the charge storage device at a usable lower control limit value; and the travel mode selection section selects the constant remaining capacity travel mode, when an electric charge capacity of the electric charge storage device falls to a usable lower control limit value after selecting the electric motor travel mode;

the internal combustion engine travel mode includes a hybrid travel mode, in which the internal combustion and the rotary electric machine are controlled based on a comparison of an electric power generation economic index and an assist economic index, the electric power generation economic index indicating an economic effect produced at time of electric power generation travel, in which the rotary electric machine is driven by the internal combustion engine to rotate and generate electric power, generated electric power is supplied to an electric power source system including the charge storage device and electric loads operable with electric power supplied from the charge storage device, and drive power for the vehicle is generated by the internal combustion engine, the assist economic index indicating an economic effect produced at time of assist travel, in which the rotary electric machine is driven to rotate by the electric power supplied from the electric power source system and drive power generated by the internal combustion engine is assisted by the drive power of the rotary electric machine; and the travel mode selection section selects the hybrid travel mode, if the remaining distance is longer than the electric motor travelable distance upon determination that the vehicle cannot arrive at the next external charge point by the electric motor travel mode.

2. The control apparatus for drive power generators of a vehicle according to claim 1, wherein:

the remaining distance calculation section calculates the remaining distance based on a present position of the vehicle successively detected by a navigation device, the next external charge position and road map information.

3. The control apparatus for drive power generators of a vehicle according to claim 1, wherein:

the remaining distance calculation section calculates the remaining distance based on an initial remaining distance inputted by a user and an actual travel distance of the vehicle after input of the initial remaining distance.

4. The control apparatus for drive power generators of a vehicle according to claim 1, wherein:

the electric motor travelable distance estimation section calculates the electric motor travelable distance based on a usable electric charge amount of the charge storage device and a travel cost, which indicates an electric discharge amount of the charge storage device per unit time in case of traveling in the electric motor travel mode.

5. The control apparatus for drive power generators of a vehicle according to claim 2, further comprising:

a travel cost learning section that learns the travel cost during actual travel of the vehicle.

6. The control apparatus for drive power generators of a vehicle according to claim 5, wherein:

the travel cost learning section learns the travel cost with respect to each external charge point.

7. The control apparatus for drive power generators of a vehicle according to claim 5, wherein:

the travel cost learning section calculates the travel cost based on the charge/discharge amount of electric power of the charge storage device during a time period from when the vehicle has stopped until when the vehicle stops next after starting to travel.

8. The control apparatus for drive power generators of a vehicle according to claim 6, wherein:

a minimum value of a plurality of travel costs is stored when the plurality of travel costs is calculated with respect to one external charge point.

9. The control apparatus for drive power generators of a vehicle according to claim 4, wherein:

the travel cost is stored with respect to each of a plurlality of predetermined areas of a travel route toward the next external charge point; and the electric motor travelable distance estimation section calculates successively the electric motor travelable distance by using the travel cost corresponding to an actual travel point from travel costs stored for the predetermined areas.

10. A control apparatus for drive power generators of a hybrid vehicle, which include an internal combustion engine and a rotary electric machine as drive power generators for generating power to drive a drive shaft of the vehicle, a charge storage device for transferring electric power to and from the rotary electric machine, and an external electric power input device for receiving electric power from an external power source external to the vehicle and charging the charge storage device with received electric power, the control apparatus comprising:

a remaining distance calculation section that calculates a remaining distance to a next external charge point, at which electric charging is possible by the external power source, the remaining distance calculation section calculating the remaining distance based on a present position of the vehicle successively detected by a navigation device, the next external charge position and road map information;

an electric motor travelable distance estimation section that estimates an electric motor travelable distance, which is a travelable distance attained by the vehicle when traveling in an electric motor travel mode by stopping the internal combustion engine and supplying the electric power from the charge storage device to the rotary electric machine used as the power generator;

a travel mode selection section that compares the remaining distance and the electric motor travelable distance to select the electric motor travel mode and an internal combustion engine travel mode based on a comparison result indicating that the vehicle can and cannot travel to the next external charge point in the electric motor travel mode, respectively, the engine travel mode using the internal combustion engine as the power generator; and a travel cost learning section that learns a travel cost during actual travel of the vehicle with respect to each external charge point, the travel cost indicating an electric discharge amount of the charge storage device per unit time in case of traveling in the electric motor travel mode, wherein the electric motor travelable distance estimation section calculates the electric motor travelable distance based on a usable electric charge amount of the charge storage device and the travel cost.

11. The control apparatus for drive power generators of a vehicle according to claim 10, wherein:

a minimum value of a plurality of travel costs is stored when the plurality of travel costs is calculated with respect to one external charge point.

12. The control apparatus for drive power generators of a vehicle according to claim 10, wherein:

the travel cost learning section calculates the travel cost based on the charge/discharge amount of electric power of the charge storage device during a time period from when the vehicle has stopped until when the vehicle stops next after starting to travel.

13. The control apparatus for drive power generators of a vehicle according to claim 12, wherein:

the internal combustion engine travel mode includes a constant remaining capacitance travel mode, in which the internal combustion engine and the rotary electric machine are usable as the power generators and the vehicle travels while maintaining a target value of the remaining capacity of the charge storage device at a usable lower control limit value; and the travel mode selection section selects the constant remaining capacity travel mode, when an electric charge capacity of the electric charge storage device falls to a usable lower control limit value after selecting the electric motor travel mode.

14. The control apparatus for drive power generators of a vehicle according to claim 11, wherein:

the internal combustion engine travel mode includes a constant remaining capacitance travel mode, in which the internal combustion engine and the rotary electric machine are usable as the power generators and the vehicle travels while maintaining a target value of the remaining capacity of the charge storage device at a usable lower control limit value; and the travel mode selection section selects the constant remaining capacity travel mode, when an electric charge capacity of the electric charge storage device falls to a usable lower control limit value after selecting the electric motor travel mode.

15. The control apparatus for drive power generators of a vehicle according to claim 10, wherein:

the internal combustion engine travel mode includes a constant remaining capacitance travel mode, in which the internal combustion engine and the rotary electric machine are usable as the power generators and the vehicle travels while maintaining a target value of the remaining capacity of the charge storage device at a usable lower control limit value; and the travel mode selection section selects the constant remaining capacity travel mode, when an electric charge capacity of the electric charge storage device falls to a usable lower control limit value after selecting the electric motor travel mode.

16. The control apparatus for drive power generators of a vehicle according to claim 15, wherein:

the internal combustion engine travel mode includes a hybrid travel mode, in which the internal combustion and the rotary electric machine are controlled based on a comparison of an electric power generation economic index and an assist economic index, the electric power generation economic index indicating an economic effect produced at time of electric power generation travel, in which the rotary electric machine is driven by the internal combustion engine to rotate and generate electric power, generated electric power is supplied to an electric power source system including the charge storage device and electric loads operable with electric power supplied from the charge storage device, and drive power for the vehicle is generated by the internal combustion engine, the assist economic index indicating an economic effect produced at time of assist travel, in which the rotary electric machine is driven to rotate by the electric power supplied from the electric power source system and drive power generated by the internal combustion engine is assisted by the drive power of the rotary electric machine; and the travel mode selection section selects the hybrid travel mode, if the remaining distance is longer than the electric motor travelable distance upon determination that the vehicle cannot arrive at the next external charge point by the electric motor travel mode.

* * * * *